United States Patent
Hauser et al.

(10) Patent No.: US 6,306,322 B1
(45) Date of Patent: *Oct. 23, 2001

(54) METHOD AND DEVICE FOR FILLING CASTING MOLDS WITH CASTING RESIN

(75) Inventors: Erhard Hauser, Schoffengrund; Wilhelm Hedrich, Ehringshausen, both of (DE)

(73) Assignee: Wilhelm Hedrich Vakuumanlagen GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/704,597
(22) PCT Filed: Mar. 17, 1995
(86) PCT No.: PCT/EP95/01014
§ 371 Date: Sep. 17, 1996
§ 102(e) Date: Sep. 17, 1996
(87) PCT Pub. No.: WO95/25001
PCT Pub. Date: Sep. 21, 1995

(30) Foreign Application Priority Data

Mar. 17, 1994 (DE) .................................. 44 09 214

(51) Int. Cl.[7] .................................................... B29C 45/00
(52) U.S. Cl. ................ 264/101; 264/328.14; 264/328.17; 425/200; 425/449
(58) Field of Search ................. 264/328.17, 328.14, 264/101; 165/163; 425/200, 449

(56) References Cited

U.S. PATENT DOCUMENTS

| | | | |
|---|---|---|---|
| 3,000,759 | 9/1961 | Barsky et al. ............................ 117/97 |
| 3,488,326 | * 1/1970 | Van Beveren et al. ................. 260/78 |
| 3,505,448 | * 4/1970 | Zjip et al. .............................. 264/328 |
| 4,182,843 | * 1/1980 | Haupt et al. .......................... 528/326 |
| 4,263,260 | * 4/1981 | Brautigam ............................. 422/201 |
| 4,321,351 | * 3/1982 | Zuppinger et al. .................... 528/91 |
| 4,792,424 | * 12/1988 | Loman ................................... 264/102 |
| 4,894,197 | * 1/1990 | Tsutsumi ............................... 264/297 |
| 5,147,660 | * 9/1992 | Steindorf ............................... 425/148 |

FOREIGN PATENT DOCUMENTS

| | | |
|---|---|---|
| 2758801 | 7/1979 | (DE) . |
| 3420222 | 12/1985 | (DE) . |
| 2407805 | 6/1979 | (FR) . |
| 1165558 | 10/1969 | (GB) . |

* cited by examiner

*Primary Examiner*—Jan H. Silbaugh
*Assistant Examiner*—Suzanne E. McDowell
(74) *Attorney, Agent, or Firm*—Liniak, Berenato, Longacre & White

(57) ABSTRACT

The invention concerns a method and device for filling at least one casting mould (10) with a castable, liquid compound, in particular casting resin. In order to decrease the mould-occupation time considerably, the reactivity of the casting compound is firstly increased at least during the filling phase for the at least one casting mould (10) by the supply of energy and is then decreased by the removal of energy to a value at which the casting compound has a relatively long service life. Heat exchanges (7) are proposed as means for heating and, if necessary, cooling the casting compound.

12 Claims, 2 Drawing Sheets

METHOD AND DEVICE FOR FILLING CASTING MOLDS WITH CASTING RESIN

DESCRIPTION

Figure 2:
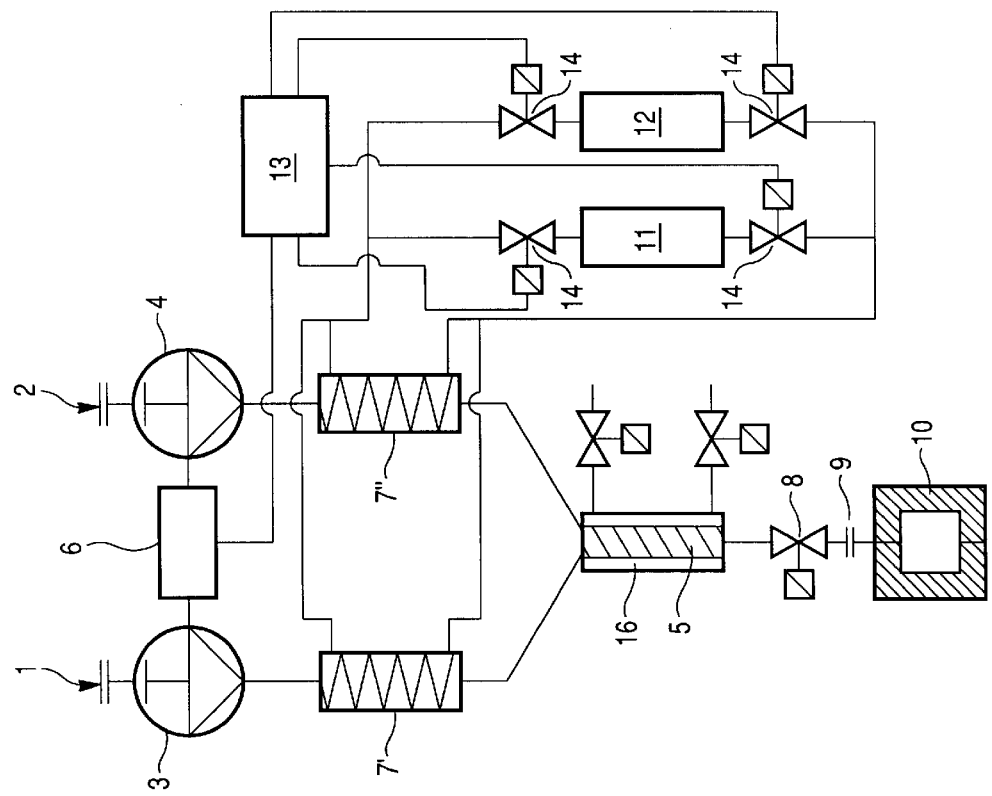

The invention relates to a method for filling at least one casting mold with a castable liquid compound, in particular casting resin, and a device for carrying out the method.

A casting device of this kind, in particular a pressure gelation device, is disclosed by DE-C 34 20 222. In this case, the casting compound is filled into so-called closed molds and is gelled at elevated temperature. The time until the castings are given their final shape depends inter alia on the volume of compound present in the lines and components of the casting device or on the accumulation of the volume of compound and is significantly longer for large-volume casting molds than for thin-walled castings. The resultant cycle time for the production of a casting essentially determines its production costs. Although heating the casting compound leads to a higher reactivity and thus to a shorter pot life, a higher temperature of the casting compound inevitably has the result that the throughput through the lines and the components of the casting device has to be high, in order to be able to exchange reactive material continually and to prevent sticking on the lines of the components. This means that the casting resin temperature and thus also the operating rate of the known casting device is determined by the production conditions during the breaks in production.

On this basis, the object of the invention is to provide a method and a device for filling at least one casting mold with a castable liquid compound, which substantially reduces the cycle time for filling the at least one casting mold and thus the mold occupation time.

The method according to the invention makes it possible to control the reactivity of the casting compound before and during the filling operation. During the filling operation, the reactivity of the casting compound is increased by supplying energy, so that the casting compound can be brought out into the mold much more quickly and thus, above all, gels more quickly in the mold. At the end of the filling operation and/or during the breaks in production, the reactivity of the casting compound is reduced by removing energy to a value at which there can be no sticking in the lines and components. During the processing and during the filling operation, therefore, the casting compound has a short pot life, with a view to a short mold occupation time. Toward the end of the filling operation, the pot life is increased again, so that the lower reactivity of the casting compound means that there is no sticking in the lines and components of the casting device. A further advantage of the method according to the invention is that, as a result of the control of the reactivity, it is also possible to process those casting compounds which need to have a certain minimum viscosity during casting, such as for example casting compounds for impregnating fine wire windings, such as in line output transformers or ignition coils. The fact that the temperature of the casting compound also approaches that of the conventionally heated casting mold has a beneficial effect on the quality of the castings, since stresses in the casting can be avoided. In the case of pressure gelation, a particularly advantageous homogeneity results on pressure gelation of the casting compound in the casting mold. A further advantage of the invention results from the fact that, as a result of the temperature control of the casting compound at the instant of processing, there is no need to heat components, such as for example reservoirs and the like, to a higher level. This results in an overall improvement in the energy balance, impairment of the material owing to material stress due to temperature stressing being further reduced.

Advantageous refinements of the method according to the invention result from the subclaims.

In accordance with one concept of the invention, it is possible, for example, for the reactivity during the filling phase of the at least one casting mold to be subjected to a repeated change, in order for instance to bring about a specific temperature profile of the casting compound, which may be of particular importance in the case of pressure gelation.

The change in the reactivity of the casting compound is preferably carried out conventionally by supplying and removing heat.

The method according to the invention is advantageously also suitable for the serial casting into casting molds, the removal of energy or reduction in temperature of the casting compound then taking place during the breaks in casting between the series using casting molds. Thus, the energy of the casting compound is not reduced after every individual part, but only after the casting molds arranged on one palette have been cast as a series and the next palette with casting molds has been introduced into the casting chamber. This significantly improves the energy balance. A procedure of this kind is always recommended when there are only relatively short breaks in casting between the individual casting operations, i.e. the casting molds are filled successively.

As an alternative or in addition to varying the reactivity by supplying energy to and removing energy from the casting compound, it is also possible, in the case of casting compounds which are formed or mixed from at least two components, to heat the components during the filling phase for filling the at least one casting mold. This results in a significantly lower viscosity of the individual components, with the advantage that mixers of smaller dimensions can be used. As a consequence of the lower viscosity of the individual components, in particular there is a smaller pressure loss within the mixer. An advantage which again results from a smaller mixer is that the volume of compound is correspondingly small, which leads to a rapid temperature change with regard to the technique according to the invention. A smaller mixer also has the advantage that the residual heat present in the casting compound at the end of the filling operation can be rapidly given off to the environment, so that in many cases a separate reduction of temperature is not required.

However, it is of course also possible according to the invention for the components to be subjected to at least one temperature change during or after the filling phase, a specific reduction in temperature of the individual components being performed. The reduction in temperature of the individual components takes place toward the end of the filling operation, so that the subsequent flow of cooler individual components drive the hot casting compound into the molds and at the end of the filling operation the lines carrying the compound as far as the runner are at a lower temperature level which is not critical with regard to the reactivity.

In addition or alternatively to the changing temperature control of the individual components, it is also conceivable for the individual components merely to be heated, while the casting compound is subjected to a cooling operation in the region between the mixing device and the runner of a casting device, toward the end of the filling phase. This may in some cases lead to an improvement in the energy balance.

The characterizing features of the device make it possible, in a manner which is simple in terms of design, to carry out heating and also reduction in the temperature of the casting compound or of the individual components in order to achieve a short mold occupation time. Advantageous refinements of the device according to the invention can be found in the dependent subclaims.

In one embodiment of the invention, it is then provided for the heat transfer to take place directly or indirectly by means of a heat exchanger surface. Direct heating can be carried out, for example, electrically by means of an electric heating means. Radiant heat may also be used to heat the compound, in that, for example, quartz lamps are directed on to a section of the line or a component of the casting device, transfer of the heat onto the compound taking place via the wall of the line section or of the component acting as heat exchanger surface. Indirect heat transfer can be carried out, for example, by means of a heat transfer medium in liquid, vapor or gas form. The choice of the heat transfer medium which is used can be made in accordance with individual requirements.

The heat exchanger can, according to the invention, be integrated for example at the output of the mixing device and/or with the mixing device.

In the case of the changing temperature control of the individual components of the casting compound, a heat exchanger may also be provided between each of the feed devices for the individual components and the mixing device. In this case, the additional constructional outlay compared to an arrangement of a heat exchanger downstream of the mixing device is counterbalanced by a corresponding increase in the heat exchanger surfaces with a simultaneous reduction of the flow resistance upstream of the mixer. This also results in a corresponding reduction of the pressure loss in the mixer, since heated components of lower viscosity pass through the mixer more easily. This measure will be preferably used for large-volume molds in which higher flow rates are required with a view to reducing the mold occupation time.

In principle, all designs of heat exchanger are suitable. A coiled pipe heat exchanger may be advantageous, the casting compound or the individual components being guided through coiled pipes and the heat transfer medium flowing around the coiled pipes from the outside. In this embodiment, it is ensured that only one flow cross section is available for the casting compound or the individual components and there can therefore be no blockage of parallel paths as in other types of heat exchanger. In addition, the helical guidance of the individual components or of the casting compound brings about a homogenization of the temperature, which substantially improves the product quality.

Of course, it is also possible to subject the compound lines, fittings, valves and other components of the device to a changing temperature control.

Further aims, advantages, features and possible applications of the present invention are given in the following description of the exemplary embodiments with reference to the drawings. In this, all the features described and/or illustrated pictorially form the subject matter of the present invention on their own or in any desired sensible combination, irrespective of their summary in the claims or the dependency thereof.

Figure 1:
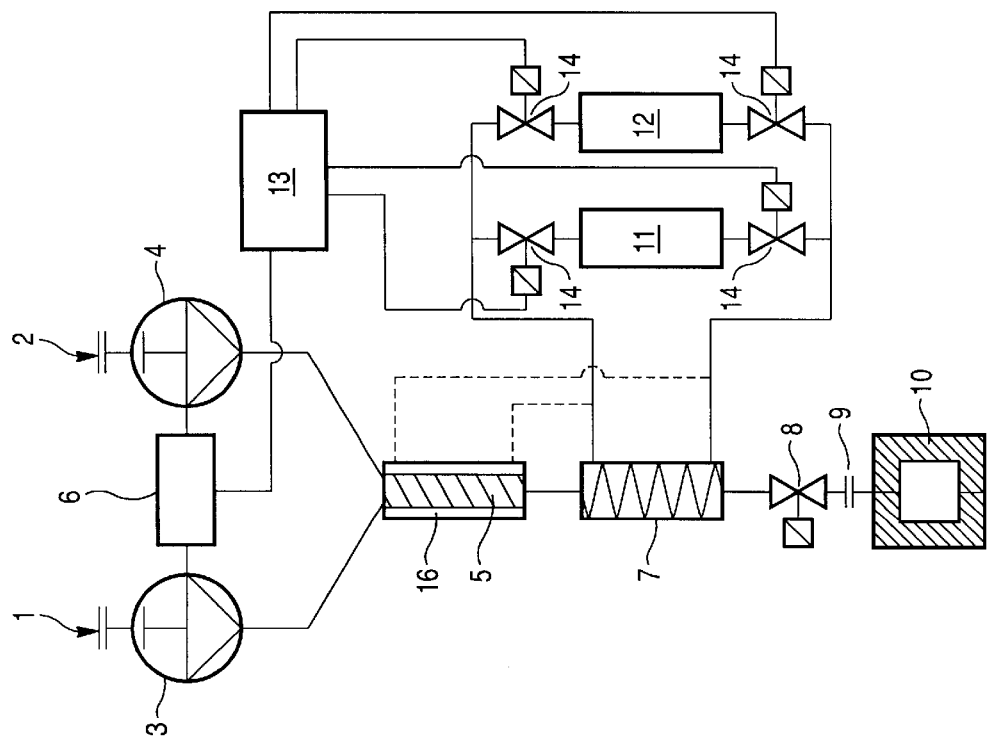
Figure 3:
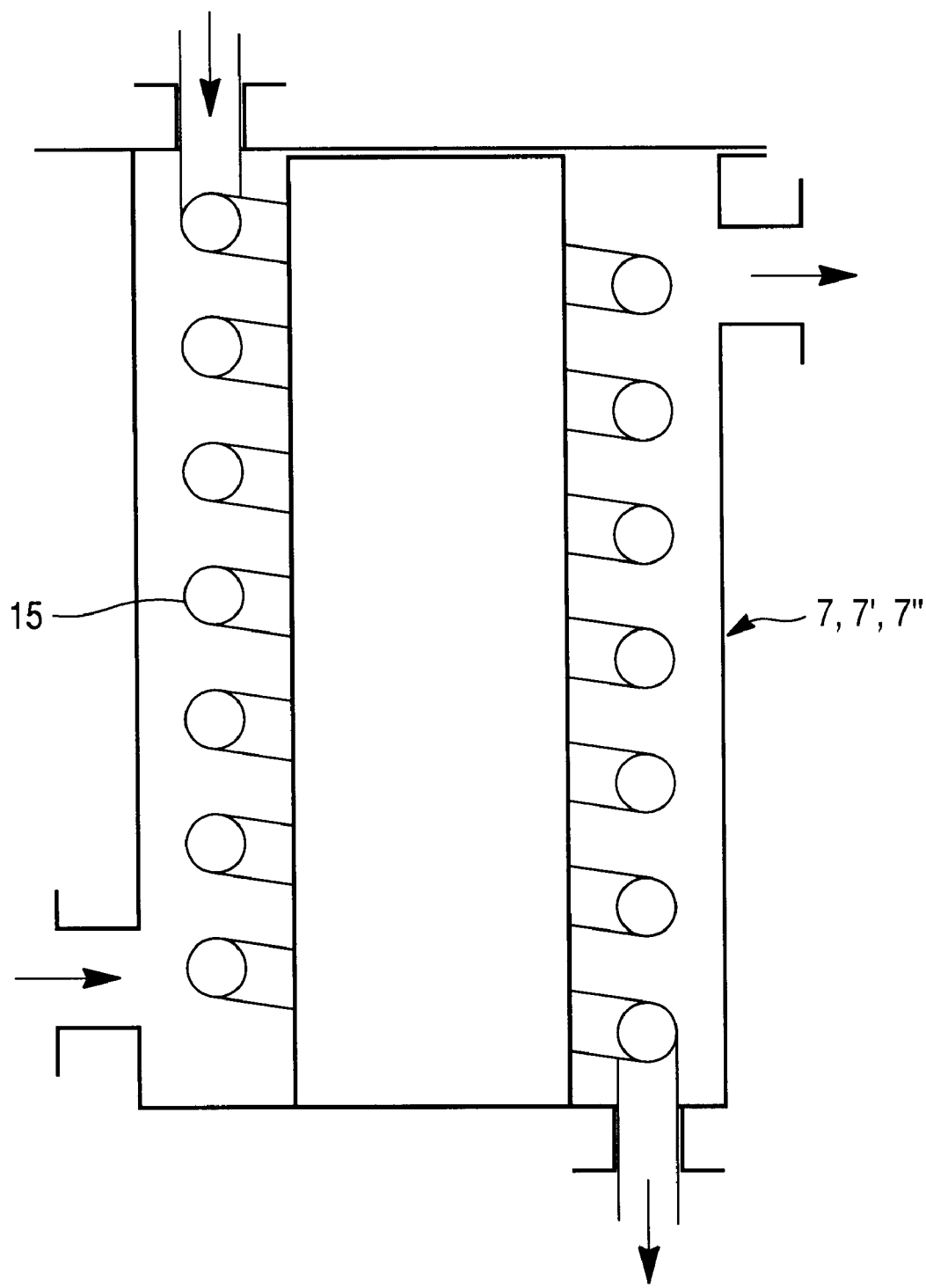

In the drawings:

FIG. 1 shows a possible embodiment of a device according to the invention for casting castable liquid media into a casting mold in the pressure gelation process, FIG. 2 shows a further embodiment of a pressure gelation device according to the invention, and FIG. 3 shows a possible embodiment of a heat exchanger to be arranged in a device according to FIGS. 1 and 2.

The device according to FIG. 1 has two connections 1, 2 to reservoirs (not shown) for the individual components of the casting compound. The connections 1, 2 lead to feed devices 3 and 4, respectively, which feed the individual components to a mixing device 5, designed in the exemplary embodiment chosen here as a continuous mixer. The feed devices 3, 4 can in their simplest embodiment be designed as metering pumps, as are described, for example, in German Patent Application P 43 44 922.0. Metering pumps of this kind can be exposed to a substantially higher operating pressure for the supply of the individual components. The feed devices 3, 4 are operated by means of a synchronizing device 6.

In the embodiment according to FIG. 1, the casting compound emerging from the mixing device 5 passes via a heat exchanger 7 located upstream, a casting valve 8 and the runner 9 leading into a casting mold 10, which in the exemplary embodiment selected here of a pressure gelation device can be opened and closed in order to remove the molding.

The heat exchanger 7 is used to heat up the casting compound emerging from the mixing device 5 and is configured, for example, as a coiled pipe heat exchanger, as is illustrated in FIG. 3. The heat exchanger 7 can optionally be connected to a temperature control device 11 or 12. As can further be seen from FIG. 1, the mixing device 5 can also be connected to the temperature control device 11, 12, but it can also be connected to a separate temperature control device (not shown).

The temperature control devices 11, 12 have different temperature levels for the heat transfer medium fed to the heat exchanger 7 or to the mixing device 5. Connection and disconnection of the temperature control devices 11, 12 in a predetermined temporal sequence with a corresponding opening and closing of the valves 14 takes place by means of a control device 13. The arrangement of the heat exchanger 7 and optionally of the heating jacket and the mixing device 5 serves to raise the casting compound to a higher temperature level during the filling operation, in order to achieve a reduction in the mold occupation time or the cycle time of the device as a result of increasing the reactivity of the casting compound.

In order to prevent the casting compound which has been activated by heating from sticking in the compound lines or the individual components and to counteract the risk of blockage, a change in temperature control of the heat exchanger 7 and optionally of the mixing device 5 is carried out such that the heat transfer medium is changed over from the temperature control device at the higher temperature, for example the temperature control device 11, to the temperature control device 12 at a lower temperature in the course of the filling operation, in dependence on the filling operation through the feed devices 3, 4 and of the synchronization device 6. As a result, at the end of the filling operation, the previously increased reactivity of the casting compound is reduced again due to the reduction in temperature, so that there can be no sticking in the compound line and mixing device during the pressure gelation process.

To this extent it may in some cases be possible to leave out the temperature control device at the lower temperature level, as long as the casting compound situated in the compound system which is set at a higher temperature is driven into the casting mold by the subsequent flow of casting compound set at a lower temperature and casting compound at a lower temperature is then present right up to the runner.

In order to achieve a favorable and, above all, homogeneous heat transfer to the casting compound, the cross sections of the heat exchanger must be correspondingly small. This accordingly leads to a higher flow resistance in the overall system. The design of the feed devices 3, 4 as piston/cylinder arrangements, as is described in Patent Application P 43 44 922.0, is particularly suitable for dealing with these higher flow resistances.

In the embodiment in accordance with FIG. 2, the components corresponding to the device in accordance with FIG. 1 are provided with identical reference numerals, so that to this extent a detailed description can be dispensed with. This pressure gelation device differs from that in accordance with FIG. 1 in that in each case a separate heat exchanger 7' and 7" is interposed in the supply lines for the two individual components to the the mixing device 5. The functioning and the temporal sequence of the changing temperature control of the heat exchangers 7', 7" essentially corresponds to the procedure described with reference to FIG. 1. The arrangement of the heat exchangers 7', 7" in the component supply lines results in a considerable reduction in the flow resistances compared with the pressure gelation device in accordance with FIG. 1. Furthermore, since the product flowing to the continuous mixer has already been reduced to a lower viscosity by the increase in temperature, the sum of the flow resistances in comparison with the device in accordance with FIG. 1 is reduced considerably, which in turn enables a structurally smaller continuous mixer to be used. A further advantage of this embodiment is that the reactive volume of compound is restricted to the continuous mixer 5 and to the short supply line to the casting mold 10.

In this embodiment too, the temperature control device 12 at the lower temperature level may be omitted, specifically when no problems resulting, for example, from sedimentation, occur during the gelling times. In this case, the heat exchangers 7', 7" could also remain continually connected to the temperature control device 11, if no reaction takes place at the individual components.

The heat exchanger device 16 of the mixing device 5 may be connected to the temperature control device 11 or 12 or, for example, also only to one of the two temperature control devices, if appropriate for a specific time period during filling of the mold. Of course, it is also possible to provide a separate temperature control device for the heat exchanger 16 of the mixing device 5.

FIG. 3 illustrates a possible embodiment of a heat exchanger 7, 7' or 7". In this coiled pipe heat exchanger illustrated schematically, the casting compound or the individual components flows or flow through the coiled pipe 15, while the heat transfer medium flows around the coiled pipe 15 from the outside. Due to the circulating movement of the casting compound or of the individual components in the coiled pipe 15, the temperature is homogenized, which is a decisive factor for the product quality. Of course, it is also possible to divide the heat exchanger into zones of differing temperature along the flowpath of the casting compound by means of additional connections for the supply and discharge of the heat transfer medium, in order to be able to heat and cool the individual components at the desired instant. A configuration of this nature is recommended in particular for relatively large heat exchangers, owing to the larger volume of compound which is present in this case. For example, the heating zones are switched off in a stepwise manner toward the end of a filling phase, in order eventually to obtain casting compound at a lower temperature level at the runner.

List of reference numerals

1—connections
2—connections
3—feed and metering device
4—feed and metering device
5—mixing device
6—synchronizing device
7—heat exchanger
7'—heat exchanger
7"—heat exchanger
8—casting valve
9—runner
10—casting mold
11—temperature control device
12—temperature control device
13—control device
14—valve
15—coiled pipe
16—heat exchanger

What is claimed is:

1. Method of filling at least one casting mold with a casting resin compound comprising the steps of:

delivering said casting compound to said at least one casting mold during a filling phase;

supplying energy to said casting compound upstream of a runner leading to said casting mold;

removing energy from said casting compound upstream of said runner leading to said casting mold;

wherein a reactivity of the casting compound, at least during the filling phase for the at least one casting mold, is initially increased by said step of supplying energy and is then reduced by said step of removing energy to a value at which the casting compound has a relatively long service life.

2. Method according to claim 1, wherein the step of removing energy takes place toward the end of the filling phase.

3. Method according to claim 1, wherein the steps of supplying and removing energy are repeated during the filling phase of the at least one mold.

4. Method according to claim 1, wherein a plurality of casting molds are casted in series and the step of removing energy occurs during breaks in casting between successive series using casting molds.

5. Method according to claim 1, the at least one casting mold is designed for one of pressure gelation and open casting.

6. Method according to claim 1, wherein the at least one casting mold is filled in vacuo.

7. Method according to claim 1, further comprising the step of mixing said casting compound from at least two components, wherein the unmixed components are heated during the filling phase for filling the at least one casting mold.

8. Method according to claim 7, wherein the components are subjected to at least one temperature change during or after the filling phase.

9. Method according to claim 7, wherein the casting compound is subjected to cooling toward an end of the filling phase, upstream of the at least one casting mold.

10. The method of filling at least one casting mold with casting resin according to claim 1, wherein said steps of supplying and removing energy from said casting compound are located proximate a single location upstream said casting mold.

11. The method of filling at least one casting mold with a casting resin according to claim 1, wherein a single heat exchanger is used to both supply and remove energy from said casting compound.

12. The method according to claim 1, wherein the change of the reactivity of the casting compound is carried out by supplying and removing heat during said steps of supplying and removing energy.

* * * * *